US012321014B2

(12) United States Patent
Mahmoud et al.

(10) Patent No.: US 12,321,014 B2
(45) Date of Patent: Jun. 3, 2025

(54) COUPLING DEVICES AND METHODS, WAVELENGTH LOCKING SYSTEMS AND METHODS, AND PHASE UNWRAPPING SYSTEMS AND METHODS

(71) Applicant: Apple Inc., Cupertino, CA (US)

(72) Inventors: Mohamed Mahmoud, Sunnyvale, CA (US); Yi-Kuei Wu, San Jose, CA (US); Lucia Gan, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/827,281

(22) Filed: May 27, 2022

(65) Prior Publication Data

US 2023/0062578 A1 Mar. 2, 2023

Related U.S. Application Data

(60) Provisional application No. 63/236,567, filed on Aug. 24, 2021.

(51) Int. Cl.
*G02B 6/293* (2006.01)
*G02B 6/12* (2006.01)
(Continued)

(52) U.S. Cl.
CPC ..... *G02B 6/29301* (2013.01); *G02B 6/29346* (2013.01); *G02B 6/2938* (2013.01); *H04B 10/801* (2013.01)

(58) Field of Classification Search
CPC .............. G02B 6/12007; G02B 6/2821; G02B 6/2835; G02B 6/29301; G02B 6/29346;
(Continued)

(56) References Cited

U.S. PATENT DOCUMENTS 6,487,336 B1  11/2002  Yao
7,333,690 B1 *  2/2008  Peale ................. G02B 6/12007
                                                      385/27
(Continued)

FOREIGN PATENT DOCUMENTS

CN    113218518     8/2021
JP    H04353804    2/1992
(Continued)

OTHER PUBLICATIONS

U.S. Appl. No. 17/945,862, filed Sep. 15, 2022, Pelc et al.
(Continued)

*Primary Examiner* — Ryan A Lepisto
*Assistant Examiner* — Erin D Chiem
(74) *Attorney, Agent, or Firm* — Brownstein Hyatt Farber Schreck, LLP

(57) ABSTRACT

Configurations for an optical device used for light splitting and wavelength locking are disclosed. The optical device may be a two by three coupler with a first waveguide coupled to a second waveguide, and a third waveguide coupled to the second waveguide. The first and third waveguides may receive input light and optically couple light to the second waveguide. The output signals of the first, second, and third waveguides may have a constant phase difference from one another over a broadband wavelength range, which may allow for phase unwrapping. By phase unwrapping the output signals over an FSR and performing further phase unwrapping over the broadband wavelength range, a continuous signal may be produced and used to sequentially lock each wavelength of light emitted by light sources over the broadband wavelength range.

11 Claims, 7 Drawing Sheets

(51) Int. Cl.
*G02B 6/122* (2006.01)
*G02B 6/125* (2006.01)
*G02B 6/28* (2006.01)
*H04B 10/80* (2013.01)

(58) Field of Classification Search
CPC .............. G02B 6/2938; G02B 6/12004; G02B 6/29385; G02B 6/1228; G02B 6/125; G02B 2006/12147; G02B 2006/12195; H04B 10/801
See application file for complete search history.

(56) References Cited

U.S. PATENT DOCUMENTS

| | | | |
|---|---|---|---|
| 7,555,220 | B2 | 6/2009 | Grubb et al. |
| 8,559,775 | B2 | 10/2013 | Babie et al. |
| 8,626,261 | B2 | 1/2014 | Ko et al. |
| 8,818,148 | B2 | 8/2014 | Boudreau et al. |
| 8,983,250 | B2 | 3/2015 | Black et al. |
| 9,020,004 | B2 | 4/2015 | Jeong |
| 9,110,259 | B1 | 8/2015 | Black |
| 9,348,154 | B2 | 5/2016 | Hayakawa |
| 9,620,931 | B2 | 4/2017 | Tanaka |
| 9,768,907 | B2 | 9/2017 | Hironishi |
| 9,835,881 | B2 | 12/2017 | Guzzon |
| 9,964,703 | B2 | 5/2018 | Parker et al. |
| 10,349,492 | B2 | 7/2019 | Sugiyama |
| 10,481,333 | B2 | 11/2019 | Soda |
| 10,534,189 | B2 | 1/2020 | Miller |
| 11,064,592 | B1 | 7/2021 | Bismuto et al. |
| 11,394,464 | B2 | 7/2022 | Nagarajan |
| 11,835,836 | B1 | 12/2023 | Wu et al. |
| 2007/0223552 | A1 | 9/2007 | Muendel et al. |
| 2008/0266639 | A1 | 10/2008 | Melloni et al. |
| 2014/0340690 | A1 | 11/2014 | Lefevre |
| 2023/0100317 | A1 | 3/2023 | Pelc et al. |
| 2024/0090102 | A1 | 3/2024 | Bismuto et al. |

FOREIGN PATENT DOCUMENTS

| | | |
|---|---|---|
| JP | H05127028 A | 5/1993 |
| JP | H0618732 A | 1/1994 |
| JP | 2015068854 | 4/2015 |
| JP | 2015532848 | 11/2015 |
| JP | 2020112450 | 7/2020 |
| JP | 2020118887 | 8/2020 |
| WO | WO 14/129613 | 8/2014 |
| WO | WO 19/214244 | 11/2019 |
| WO | WO 20/039553 | 2/2020 |

OTHER PUBLICATIONS

He et al., "Integrated Polarization Compensator for WDM Waveguide Demultiplexers," IEEE Photonics Technology Letters vol. 11, No. 2, Feb. 1999, pp. 224-226.

Anonymous, "Multi mode Interferometer," Wikipedia, retrieved from https://en.wikipedia.org/w/index.php?title=Multi_mode_interferometer&oldid=1024100316, May 20, 2021, 2 pages.

Cai et al., "Analysis of the Coupling Characteristics of a Tapered Three-Guide Coupled System," *Journal of Lightwave Technology*, IEEE, USA, vol. 8, No. 10, Oct. 1, 1990, pp. 1621-1629.

Vance et al., "Design procedures for passive planar coupled waveguide devices," *IEE Proceedings: Optoelectronics, Institution of Electrical Engineers*, Stevenage, GB, vol. 141, No. 4, Aug. 1, 1994, pp. 231-241.

Yuanmin et al., "Analysis of the Coupling Characteristics of a Tapered Three-Guide Coupled System," *Journal of Lightwave Technology*, Oct. 1990, vol. 8, No. 10, pp. 1621-1629.

* cited by examiner

COUPLING DEVICES AND METHODS, WAVELENGTH LOCKING SYSTEMS AND METHODS, AND PHASE UNWRAPPING SYSTEMS AND METHODS

CROSS-REFERENCE TO RELATED APPLICATIONS

This application claims the benefit under 35 U.S.C. § 119(e) of U.S. Provisional Patent Application No. 63/236,567, filed Aug. 24, 2021, the contents of which are incorporated herein by reference in their entirety.

FIELD

This disclosure relates generally to optical couplers. More particularly, embodiments herein relate to an optical system with optical coupling waveguides that output signals that may be used for phase unwrapping to wavelength lock light sources.

BACKGROUND

Generally, optical systems employ multiple light sources to measure various types of information. In some instances, it may be useful to monitor the optical properties of the light emitted by the light sources. For example, the optical properties of the light emitted by the light sources can be measured and monitored to ensure that a light source has a certain degree of wavelength stability. Further, wavelength locking may be achieved when dealing with a single wavelength or a small wavelength range, but increases in complexity for multiple wavelengths or a wavelength range spanning a greater number of wavelengths.

Some of these optical systems may output light at multiple different wavelengths simultaneously and/or sequentially. However, as the number of monitored wavelengths increase, the size and complexity of the system increases as well. Due to the scaling of the size of the optical system with the number of wavelength locked wavelengths, the optical systems used for monitoring light may not be suitable for certain applications due to factors such as size and complexity. As one example, such optical systems may take up too much space to be reasonably incorporated into compact electronic devices, such as mobile phones, tablet computing devices, laptops, wearables, and the like. Additionally, existing optical systems for monitoring light may function over a narrow wavelength range and may not operate in different or broad wavelength ranges. Accordingly, it may be desirable to employ a system for locking the wavelengths of light across a large wavelength range while maintaining a compact form factor for incorporation in compact electronic devices.

SUMMARY

Embodiments of the systems, devices, methods, and apparatuses described in the present disclosure are directed to a two by three coupler used for wavelength locking. Also described are systems, devices, methods, and apparatuses directed to phase unwrapping a free spectral range and all the wavelengths over a broadband wavelength range. The two by three coupler may generate output signals having sinusoidal wavelength responses with a constant phase difference from one another over the broadband wavelength range, which may allow for the phase unwrapping over the broadband wavelength range. By phase unwrapping the output signals over a free spectral range and performing further phase unwrapping over the broadband wavelength range, a continuous signal may be produced and used to lock each wavelength over the broadband wavelength range. The continuous signal may produce a one to one relationship between each wavelength and the phase unwrapped signal.

In some examples, the present disclosure describes an optical device. The optical device may include a first waveguide configured to receive a first light and output a first output signal with a first wavelength response with a first phase shift, a second waveguide optically coupled to the first waveguide and configured to output a second output signal with a second wavelength response with a second phase shift, and a third waveguide optically coupled to the second waveguide and configured to receive a second light and output a third output signal with a third wavelength response with a third phase shift, where a phase difference between the first phase shift, the second phase shift, and the third phase shift is constant.

In some examples, the present disclosure describes an optical system for monitoring a wavelength of a light source. The optical system may include a light source configured to generate light, a splitter for receiving and splitting light received from the light source into a first and second split light, a phase shifter positioned to receive the first split light and to phase shift the first split light, a two by three coupler configured to receive the first split light from the phase shifter, receive the second split light from the splitter and output a first output signal, a second output signal, and a third output signal, each of which has a respective intensity based on a respective interference between the first split light and the second split light. The optical system may also include a controller configured to monitor a wavelength of the light received by the splitter using intensities of the first output signal, the second output signal, and the third output signal.

In some examples, the present disclosure describes a method for phase unwrapping signals. The method may include generating a first output signal, a second output signal, and a third output signal, each having a wavelength response separated from one another by a constant phase difference, extracting an unwrapped phase from the first output signal, the second output signal, and the third output signal, across a wavelength range, thereby producing an unwrapped phase signal, differentiating the unwrapped phase signal, thereby producing a differentiated signal, producing a compensated differentiated signal by comparing the differentiated signal to a threshold voltage, and integrating the compensated differentiated signal, thereby generating an integrated signal configured for use in producing a continuous signal for wavelength locking.

In addition to the example aspects and embodiments described above, further aspects and embodiments will become apparent by reference to the drawings and by study of the following description.

Figure 1:
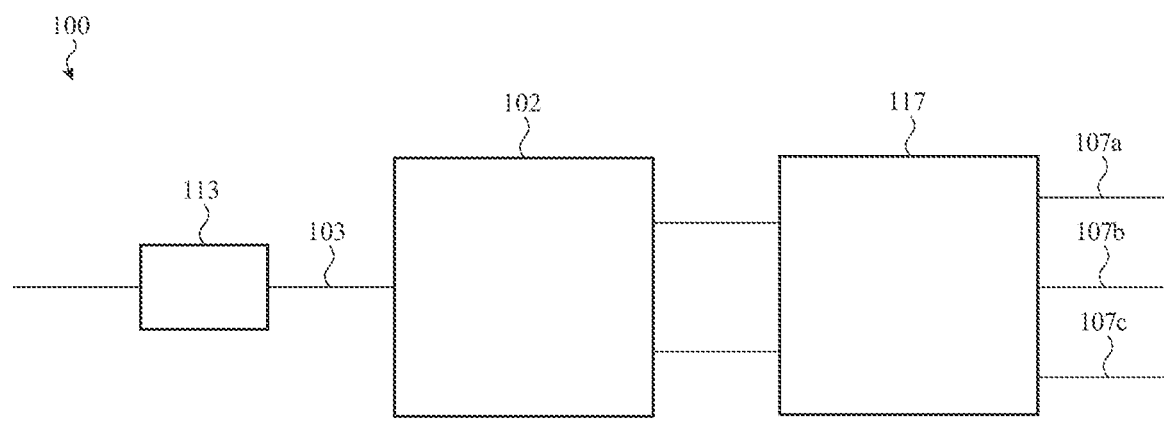
FIG. 1 is a block diagram of an example wavelength locking system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Two elements that are "coupled to" one another may be permanently or removably physically coupled to one another and/or operationally or functionally coupled to one another. Generally, physically coupled elements refer to a physical connection between two or more elements that at least partially defines or limits the relative positioning of the elements. Further, two or more elements that are operationally or functionally coupled may affect one another in that the operation of a first element may affect or impact the operation of a second element either directly or indirectly. Additionally, two elements that are "optically coupled" to one another may allow light to pass and/or couple from one element to the other element.

In the following description of examples, reference is made to the accompanying drawings in which it is shown by way of illustration specific examples that can be practiced. It is to be understood that other examples can be used and structural changes can be made without departing from the scope of the various examples.

Disclosed herein is an integrated photonics system that employs one or more light sources outputting multiple wavelengths that may be combined together using a two by three coupler having two inputs and three outputs. Specifically, the two by three coupler splits light received at each of its inputs between its three outputs. When light is simultaneously received at both of its inputs, the three outputs will each output a different combination of the input light. The two by three coupler may be used to combine light across a large wavelength range (simultaneously or sequentially) while maintaining a compact form factor. The output signals from the two by three coupler may be used by the integrated photonics system to control and stabilize the wavelength(s) of light emitted by the integrated photonics system, via wavelength locking.

The integrated photonics system may further include an on-chip wavelength locking system for wavelength locking a light source to a target wavelength. In some embodiments, the integrated photonics system includes a wavelength locking system with multiple light sources, and the wavelength locking system may sequentially lock each of the multiple light sources to a respective target wavelength. At least some of the multiple light sources may each emit light at different respective nominal wavelengths, which collectively span across a range of wavelengths (as determined by the overall specifications of the integrated photonics system), thus it may be desirable for the wavelength locking system to be able to effectively perform wavelength locking across the entire range of wavelengths. Generally, the embodiments described here may be capable of locking to wavelengths across a broadband wavelength range (e.g., a wavelength range spanning at least one micron). In other words, the wavelength locking system may be capable of locking the wavelength for two light sources, where the wavelength emitted by each light source is separated by at least one micron.

The on-chip wavelength locking system may utilize a two by three coupler as described herein. Specifically, the two-by-three coupler may be configured to receive two input signals and output three output signals, and may be configured such that, when the two inputs include phase-shifted light (collectively, "input light") of a certain wavelength, each output signal has an intensity based on a respective interference between the input signals (as will be described in more detail herein). The intensity of each output signal is wavelength dependent, such that when the wavelength of the input light changes, the intensity of each output signal also changes. Specifically, for each output there is a sinusoidal wavelength relationship between the input light wavelength and the output intensity; put another way, the output intensity varies sinusoidally as a function of input light wavelength. The two by three coupler can be configured such that the sinusoidal wavelength relationship for each output each has different phases, such that there is no simultaneous overlap between the maximums and minimums for the three output signals across a target wavelength range, which may allow the output signals to be used to lock the wavelength of the input light as will be further described herein.

The wavelength locking system can include a light splitting two by three coupler used for splitting two inputs of light into three outputs of light. The wavelength locking device may also be used for monitoring as well as wavelength locking the wavelength of the corresponding light source to a target wavelength. Generally, each light source may sequentially emit a separate wavelength of light to which it may be locked. The two by three coupler includes a middle waveguide in between the two outer arms of the device, thus producing three output signals. As previously described, the intensity of each output signal may be wavelength dependent so that the intensity of each output signal changes when the wavelength of the input light changes.

This wavelength locking device may be symmetric about a horizontal axis, and the light in one arm may have a phase shift relative to the light in the other arm (and/or the input light to the coupler), resulting in outputting signals each with an amplitude (e.g., intensity) and that have a sinusoidal wavelength relationship to one another. The sinusoidal wavelength relationship is such that the maximum and minimum of at least one of the output signals does not align with the maximums and minimums of the other output signals. The two by three coupler may have a relatively small footprint while outputting signals to be used for wavelength locking an output to a desired wavelength. In some embodiments, this wavelength locking occurs for light having a broadband wavelength range of approximately one micron.

By coupling light into the middle waveguide, which is positioned between the two outside waveguides of the two by three coupler, the two outside waveguides may produce output signals with a sinusoidal wavelength relationship over a broad wavelength range. The output signals of the two by three coupler may be similar to that of three Mach-Zehnder interferometers ("MZIs"), but the two by three coupler may be smaller than this combination of MZIs as the size and complexity of the locking techniques grow as the wavelength range increases.

As described herein, the constant phase difference is the sinusoidal wavelength relationship of the output signals that result from the multiple mode two by three coupler which may result in output signals having dead zones that do not align with one another. That is, each output signal may have an intensity based on a respective interference between the input signals with one another. The intensity of each output signal is wavelength dependent such that for each output there is a sinusoidal wavelength relationship between the input light wavelength and the output intensity, and the output intensity varies sinusoidally as a function of input light wavelength. The sinusoidal wavelength relationship of each of the output signals may each have different phases and constant phase differences between the sinusoidal wavelength relationships, so that the output signals may not overlap between the maximums and minimums of the three output signals across a target wavelength range; this may allow the output signals to be used to sequentially lock the wavelength of the input light.

Although systems exist that may be used for wavelength locking, they may be limited to functioning in a narrow wavelength range (such as 50 nanometers), may introduce unaccounted-for phase shifts, may have high optical loss, may be too large for integration into an electronic device (such as a mobile or wearable device), and so forth. Wavelength locking may be used in various photonics applications including, but not limited to, telecommunications, medical devices, spectroscopy, and the like. Maintaining wavelength accuracy in photonics applications may be important for accurate data collection and wavelength locking may prevent undesirable deviations in emitted wavelengths of light. Wavelength locking and how it is achieved is described in further detail herein with reference to FIG. 1.

As used herein, a "working zone" is a wavelength range of a single output signal where the single output signal has a slope that is not zero, or substantially close to zero. Further, a "dead zone" is a wavelength range of a single output signal where the single output signal has a slope that is zero or close to zero, such as at and around the peaks and troughs of the single output signal. Put another way, the working zone is any part of the single output signal that is not a dead zone. Accordingly, points in the working zone have higher slopes than points in the dead zone. In other embodiments with multiple output signals that have a sinusoidal wavelength relationship to each other, the multiple output signals may each have a consistently different phase. Although each of the multiple output signals may have a slope at some point that is zero or close to zero, the dead zones of each output may fall at different points in the wavelength range, thus at least one output signal of the multiple output signals may have a slope that is not zero or not a "dead zone."

As described herein, in dead zones of the output signal of other solutions, it may be difficult to discern small changes in wavelength, which in turn may limit the accuracy of wavelength locking based on this output signal. By contrast, the wavelength locking device described herein may operate more effectively because, at any given wavelength, at least one output signal is in a corresponding working zone for that signal. Accordingly, there may always be an output signal with a large slope and a large difference between the target wavelength and the measured wavelength.

Wavelength locking devices that sequentially produce these multiple output signals with a constant phase difference over the wavelength range of interest are typically small in size (at least, as compared to other, prior devices that perform wavelength locking), have lower complexity than other structures with similar functionality, and are able to accurately determine the difference between measured wavelength and target wavelength of the signal. This determined difference can be used for wavelength locking. Using the sinusoidal output signals for wavelength locking will be described in further detail with reference to FIG. 1.

As used throughout this specification, a reference number without an alpha character following the reference number can refer to one or more of the corresponding references, the group of all references, or some of the references. For example, "209" can refer to any one of the light paths 209 (e.g., light path 209a or light path 209b, etc.), or can refer to both of the light paths 209, depending on the context in which it is used. The term light paths 209 may be used when discussing a general property of the light paths.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

These and other embodiments are discussed below with reference to FIGS. 1-7B. However, those skilled in the art will readily appreciate that the detailed description given herein with respect to these Figures is for explanatory purposes only and should not be construed as limiting.

Wavelength Locking System

FIG. 1 illustrates a block diagram of an example wavelength locking system 100 that includes light source(s) 113, splitter 102, and wavelength locking device 117. The light source(s) 113 emits input light along light path 103 to the splitter 102. Generally, the light paths 103 may represent waveguides, optical fibers, free space optics, or other elements or media through which light travels. In the embodiment of FIG. 1, the light path 103 is a waveguide though alternatives to waveguides (e.g., light propagating through a medium such as air or polysilicon between devices) may be used in the larger system for coupling light into the wavelength locking device 117.

The splitter splits the input light received from input light path 103 and passes the split light to the wavelength locking device 117. The wavelength locking device 117 generally includes three waveguides (e.g., in the form of a two by three coupler) that receive light (directly or indirectly) from the splitter 102. In some embodiments, the wavelength locking device 117 may include additional splitters that provide light to multiple waveguides that are optically coupled to one another. In other embodiments, the wavelength locking device 117 may include multiple waveguides and/or may not include additional splitters. For example, two light inputs may be passed via two light paths to the wavelength locking device 117 as opposed to one light input that is split and passed to the wavelength locking device 117. Additionally, a phase shifter (not shown) may receive light from one output of the splitter 102 to phase shift the light passed to one of the waveguides. These embodiments are described in further detail with reference to FIGS. 2-7B.

In some embodiments, the wavelength locking device 117 may produce output signals (e.g., output light) via light paths 107a, 107b, and 107c that are used to lock the wavelength of light of the light sources 113. The output signals may be produced via the interference between the phase shifted light passed to one of the waveguides of a two by three coupler. The wavelength locking device 117 may produce output signals, each of which has a sinusoidal relationship with the wavelength of light, and that have a constant phase difference between the sinusoidal relationships. Accordingly, the dead zones of the output signals may not align for any wavelength in the wavelength range of light inputted by the light source(s) 113.

By analyzing the outputs of the wavelength locking device 117, the wavelength locking system 100 may identify shifts in the wavelength of light outputted by the light sources 113. Specifically, as the wavelength changes, the intensity of each output will change according to the sinusoidal wavelength relationship. A controller (not shown) may measure the change in one or more of the output signals, and may use one or more of these changes (e.g., the output signal with the largest magnitude change) as an indication of wavelength change. This change may be used by the controller as feedback in controlling the output of the light sources 113.

Optionally, the output signals may be transmitted to a phase unlocking device (which may be an integrated circuit performing a particular function, digital logic, and the like) that extracts the phases from the output signals. This extracted phase information may be used to determine a difference between the measured wavelength(s) and a target wavelength(s) so that the light source may be adjusted to emit the target wavelength. Wavelength locking systems and the two by three coupler are described in further detail herein with reference to FIGS. 2-7B.

Figure 2:
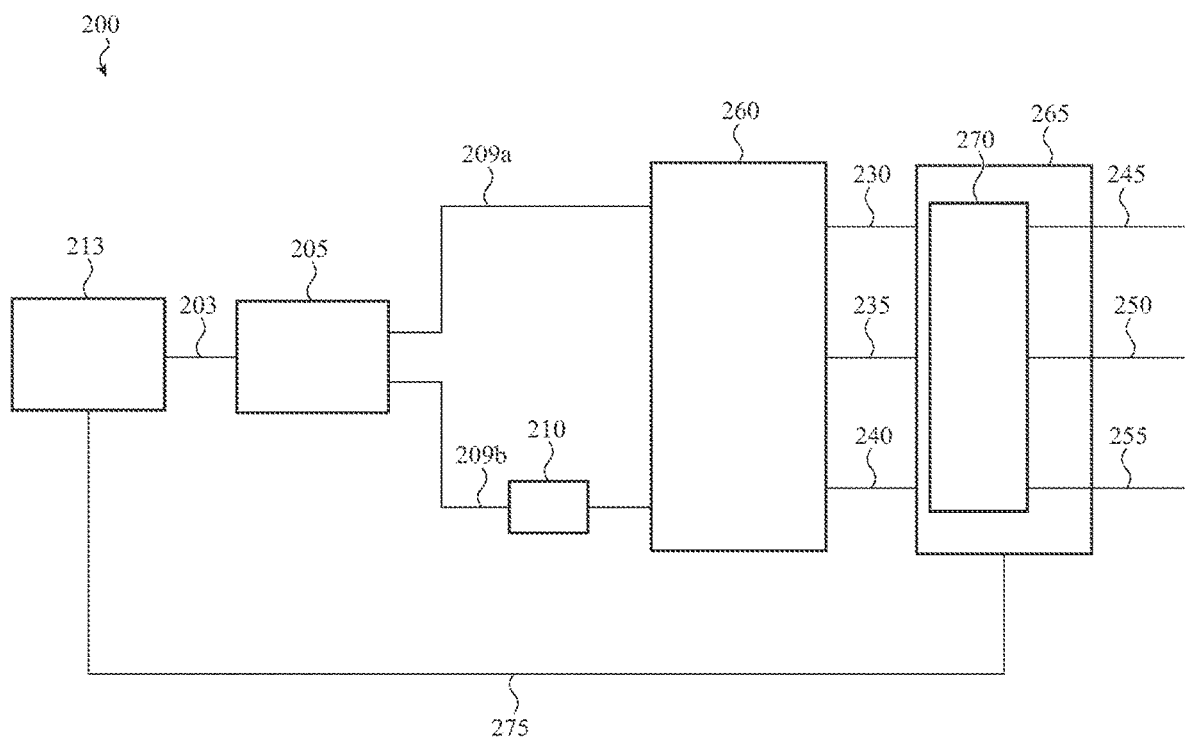
FIG. 2 is a block diagram of an example wavelength locking system, including a two by three coupler.

FIG. 2 illustrates a block diagram of an example wavelength locking system 200, including a two by three coupler and a controller block that may include a set of photodetectors. The wavelength locking system 200 may be used to lock a light source to any target wavelength selected from a wavelength range. In some instances the wavelength locking system 200 may be used to lock generated light to any of multiple different wavelengths across a wavelength range spanning one micron, but it should be appreciated that the wavelength locking systems described herein may be used with any suitable wavelength range (e.g., spanning less than 100 nm, spanning at least 100 nm, spanning at least 500 nm, or spanning at least 1300 nm). Indeed, in some instances the wavelength range is only limited by the range of wavelengths that can be emitted by the light source or sources and the underlying materials that are used to form the coupler itself (e.g., the wavelengths at which light may be carried by a given waveguide material).

The wavelength locking system 200 includes a splitter 205, a phase shifter 210, a two by three coupler 260, and a controller 265. As shown in FIG. 2, the splitter 205 is a one by two splitter; however, any appropriate component or combination of components may be used to achieve similar optical splitting functionality (e.g., 1XN splitters and NXM splitters) to provide two inputs to the two by three coupler 260. The splitter 205 is optically coupled to one or more light source 213, and receives input light via light path 203 from one or more light sources 213. The splitter 205 may split a light output of the light source 213 between two output light paths, and passes a first split light to the two by three coupler 260 via light path 209a and a second split light to the phase shifter 210 via light path 209b. The phase shifter 210 may introduce a phase shift or delay to the light received via light path 209b to create a phase difference between the light received via light path 290a and 290b. Although the two by three coupler 260 is described in FIG. 2 in the context of the wavelength locking system 200, the two by three coupler 260 may be used in any system for combining two inputs of light and outputting three signals. The controller 265 may receive the first light output signal 230, the second light output signal 235, and the third light output signal 240 from the two by three coupler 260. The controller 265 may monitor a wavelength of the light received by the splitter 205 using intensities of the first output signal 230, the second output signal 235, and the third output signal 240.

The light source(s) 213 may emit light along light path 203 that is received by the splitter 205. The light source(s) 213 may include a single light source or a plurality of light sources. In some examples, the light source(s) 213 may be any coherent or semi-coherent light source, or any combination thereof. Each light source(s) 213 may emit a single wavelength of light or may be configured as a tunable light source that may emit across a range of wavelengths of light, for example 15 nanometers although other tunable light sources may have different ranges that may be greater than or less than 15 nanometers. Additionally, any number of light sources may be employed in the wavelength locking system 200.

Continuing with the description of FIG. 2, the splitter 205 passes the split light via the light paths 209a and 209b to the two by three coupler 260. The two by three coupler 260 generally includes three waveguides. The first waveguide of the two by three coupler 260 receives light via light path 209a and the third waveguide of the two by three coupler 260 receives light via light path 209b. The second waveguide may be a middle waveguide that is optically coupled to and positioned between both the first waveguide and the third waveguide. All three waveguides of the two by three coupler 260 may output light along a unique one of the output light paths via the corresponding outputs of the two by three coupler 260. One example of the configuration of the two by three coupler 260 and its relative layout is discussed below with respect to FIGS. 3A and 3B, and another is discussed below with respect to FIGS. 7A and 7B. Light may couple from the first and third waveguides to the second, middle waveguide, allowing the light between the waveguides to interfere with one another and generate three light output signals 230, 235, 240.

Specifically, some of the light received by the first waveguide will couple to the second waveguide, and from there into the third waveguide. Similarly, some of the light received by the third waveguide will couple to the second waveguide, and from there into the first waveguide. As a result, each waveguide outputs light that includes components received from both the first and third waveguide. The first waveguide may produce the first output signal 230, the second waveguide may produce the second output signal 235, and the third waveguide may produce the third output signal 240. As previously described, each output signal may have an intensity based on a respective interference between the input signals with one another. The intensity of each output signal is wavelength dependent so that for each output there is a sinusoidal wavelength relationship between the input light wavelength and the output intensity, and the output intensity varies sinusoidally as a function of input light wavelength (also referred to herein as the "wavelength response" of the output signal). The configuration and functionality of the three waveguides will be discussed in further detail with reference to FIGS. 3A-4B.

As previously described, the controller 265 may receive the first output signal 230, the second output signal 235, and the third output signal 249 from the two by three coupler 260. The controller 265 may include a set of detectors 270 that convert the first output signal 230, the second output signal 235, and the third output signal 240 to a first digital output signal, a second digital output signal, and a third digital output signal. In some embodiments, the first output signal 230, the second output signal 235, and the third output signal 240 may be intensities of light, whereas the first digital output signal 245, the second digital output signal 250, and the third digital output signal 255 may be the digital signal equivalents of these light-based output signals that may be converted by the set of detectors 270.

The controller 265 may generate a feedback signal 275 based on the first, second, and third output signals 230, 235, and 240 to control the light source(s) 213. When the wavelength of light emitted by the light source(s) 213 deviates from a target wavelength, the feedback signal 275 adjusts the operation of the light source(s) to adjust the wavelength of light emitted by the light source(s) 213 back toward the target wavelength. For example, at a given wavelength the first, second, and third output signals 230, 235, and 240 will each have a corresponding target output value (e.g., a first output target, a second output target, and a third output target). Similarly, the first, second, and third digital output signals 245, 250, and 255 will have corresponding target digital values.

The controller 265 may compare the first, second, and third output signals 230, 235, and 240 to their corresponding output target values (e.g., by comparing the first, second, and third digital output signals 245, 250, and 255 to their corresponding digital target values), and may generate the feedback signal 275 as a function of the deviations from these target output values. The feedback signal 275 in turn controls the light source(s) 213 to adjust one or more operating parameters that change the wavelength of the light source(s) 213. Accordingly, the controller 265 may provide closed-loop control of the light source(s) 213 to maintain the wavelength at a target wavelength by maintaining the first, second, and third output signals 230, 235, and 240 at their respective target output values.

As previously noted, many existing light couplers are large and difficult to reduce in size. The single two by three coupler 260 may be more compact and space-efficient than such existing couplers. Additionally, the wavelength locking system 200 may be temperature insensitive, while many other light couplers vary their outputs with temperature. Additionally, the output signals produced by the wavelength locking system 200 may not have aligned dead zones (e.g., the dead zones of the output signals may be offset in time from one another) and so may reliably generate output light carrying information regarding any discrepancy between the actual wavelength or range of wavelengths of the output light and target wavelength or target range of wavelengths of a target light.

Two by Three Coupler

Figure 3A:
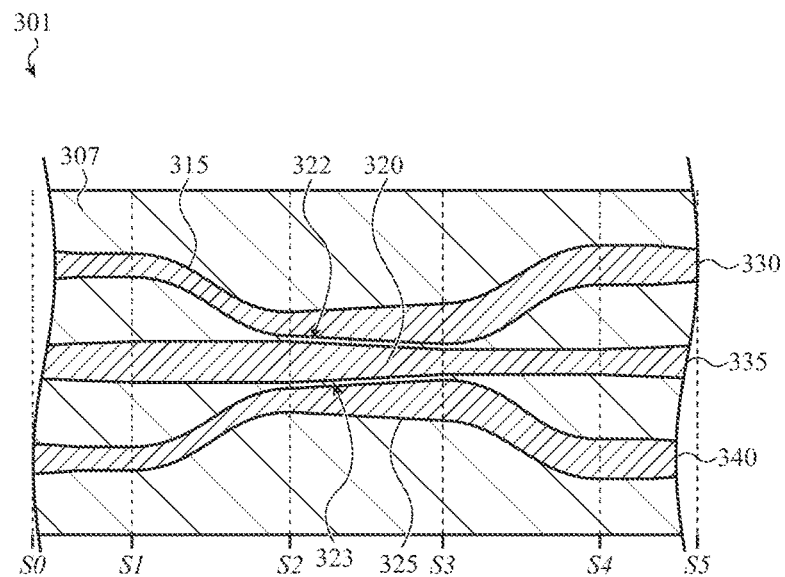
FIG. 3A is a cross-sectional view of a two by three coupler.

FIG. 3A is a cross-sectional view of a two by three coupler 301 that defines five regions. The first region (or the "input region") is between lines S0 and S1, which generally represent an input region at which each of the waveguides is positioned far enough from each other where coupling will not occur between the waveguides. The second region (or the "first S-bend region") is between lines S1 and S2, representing a first S-bend region or the point at which the sidewalls of the output waveguides begin to curve and light may possibly begin to couple from the first and third waveguides (e.g., the outside waveguides) to the second waveguide (e.g., the middle waveguide). The third region (or the "central region") is between S2 and S3, representing a primary coupling region where light may couple between the first and third waveguides (e.g., the outside waveguides) and the second waveguide (e.g., the middle waveguide). The fourth region (or the "second S-bend region") is between S3 and S4, representing the second S-bend region or the point at which the curve of the sidewalls of the first and third waveguides may terminate and light may terminate coupling from the first and third waveguides (e.g., the outside waveguides) to the second waveguide (e.g., the middle waveguide). The fifth region (or the "output region") is between S4 and S5, representing a region where the light may be output from the first, second, and third waveguides without further coupling between the waveguides. These regions and characteristics thereof will be discussed herein. The regions discussed herein are used for explanatory purposes and do not depict discrete regions in the device that have different material compositions.

Further, S-bend regions may be differently shaped (e.g., ninety degree angles, straight, 45 degree angles, and so forth), the waveguides in the central region may be tapered or not tapered, and the waveguides in the input region may be curved, S-shaped, or any other shape. In still other embodiments, the first waveguide 315 and the third waveguide 325 may curve at different rates from one another and there may not be any linear sections or S-bend shapes in the waveguides in the first region bounded by lines S0 and S1 and the second region bounded by lines S1 and S2.

The regions may have any configuration with waveguides of various shapes so long as the waveguide configurations result in the light interacting in the desired manner in the respective regions, as follows. Put another way, the specific embodiments described herein are for explanatory purposes only, and not limiting as the waveguides may be straight or curved in various ways so long as the desired light coupling and wavelength response results. The desired light coupling may include spacing of the waveguides in the input region such that little to no coupling occurs between the waveguides in the input region (e.g., the region bounded by lines S0 and S1). In the input region, the waveguides may be positioned closer to one another so that light coupling between the waveguides may start to occur and, in the central region, the waveguides may be positioned relative to one another so that more of the light coupling occurs between the waveguides. The waveguides in the second S-bend region may be spaced apart and separated from one another so that light may no longer couple between the waveguides.

In some embodiments, the first waveguide 315, the second waveguide 320, and the third waveguide 325 may be strip waveguides, although in some instances rib waveguides may be used with a rib to strip waveguide conversion. Additionally, although the first waveguide 315, the second waveguide 320, and the third waveguide 325 are depicted with similar cross-hatching patterns, they are separate waveguides from one another (although they may be formed from or composed of similar or identical material).

The two by three coupler 301 includes an input region (bounded in FIG. 3A by lines S0 and S1), which includes corresponding input regions of the first waveguide 315 and the third waveguide 325, and, in the embodiment illustrated in FIG. 3A, an input region of the second waveguide 320. Specifically, when the two by three coupler 301 is incorporated into an optical system, the input regions of the first waveguide 315 and third waveguide 325 may be optically connected to other components of the optical system to receive light therefrom. Conversely, the second waveguide 320 may be incorporated into the optical system so that it is present in the input region, but does not receive light via the input region of the second waveguide 320. Accordingly, the second waveguide 320 in these instances may receive light only via coupling from the first waveguide 315 and the third waveguide 325. While the second waveguide 320 is shown in FIG. 3A as having an input region positioned in the input region of the two by three coupler 301, it may alternatively start in the second region (i.e., bounded by the lines S1 and S2).

The second region (first S-bend region as illustrated as bounded by S1 and S2), is a region in which the distances between first, second, and third waveguides 315, 320, 325 decrease between the first region and the third region to allow for coupling between the waveguides in the third region. Accordingly, one or more of the first, second, and third waveguides 315, 320, 325 include one or more bends or curves (such as an S-bend or a C-bend). The terms S-bend and S-shaped may be used interchangeably herein to describe the shape of the first and third waveguides 315, 325 as depicted in the first S-bend region and second S-bend region of FIG. 3A. Each waveguide of the two by three coupler may have any suitable combination of curved and straight sections, and curved sections may bend away from a previous segment's trajectory at any suitable angle (e.g., ninety degrees, 45 degrees, 30 degrees) or the like As previously described, although the second and fourth regions are referred to herein as the first and second S-bend regions, this is for reference and explanatory purposes only and the waveguides bounded by S1 and S2 are not limited to S-shaped bends.

In the variation shown in FIG. 3A, the first S-bend region has portions of a first waveguide 315 and a third waveguide 325 that are S-shaped and also includes a concomitant portion of the second waveguide 320 that is straight. In the first S-bend region, the portion of the first waveguide 315 is curved and has an S-bend shape, which positions the outer arm of the two by three coupler closer to the portion of the second (e.g., middle) waveguide 320. Similarly, the portion of the third waveguide 325 has an S-bend shape that positions the other outer arm of the two by three coupler closer to the portion of the middle of the second waveguide 320. The second waveguide 320 is illustrated as being straight in the input region and the first S-bend region, but these portions of the second waveguide 320 may be curved in other embodiments. Generally, the shape of these portions of the second waveguide 320 depends primarily on the shape or configuration of corresponding portions of the first waveguide 315 and the third waveguide 325 and the desired portion of the optical coupling efficiency. For example, these portions of the second waveguide 320 may be S-shaped in order to optically couple more light from one waveguide than the other.

Additionally, the third waveguide 325 is depicted with a shape that is approximately symmetric or a mirror image to the corresponding portion of the first waveguide 315 in the five regions of the wavelength locking system 300. In other embodiments, the third waveguide 325 may be symmetric to corresponding portions of the first waveguide 315 in some regions but not others. As yet another option, a portion of the third waveguide 325 may not be symmetric to a corresponding portion of the first waveguide 315 in any of the five regions. It may be understood, as described herein, that the first waveguide 315 is a single waveguide that extends between lines S0-S5, with various portions of the waveguide lying in each of the regions indicated by adjacent lines (e.g., one portion within the region defined by S0 and S1, another within the region defined by S1 and S2, and so on). Similar logic may be applied to the second waveguide 320 and the third waveguide 325.

The central region (e.g., extending from S2 to S3) is a region in which light couples between the first, second, and third waveguides 315, 320, 325. Specifically a portion of light travelling through the first waveguide 315 in the central region may couple into the second waveguide 320, and vice versa. Similarly, a portion of light travelling through the third waveguide 325 in the central region may couple into the second waveguide 320, and vice versa. In this way, the central region of the two by three coupler 301 may be configured such that light received at the input region of the first waveguide 315 is at least partially coupled into the second waveguide 320, and at least a portion of that light is coupled from the second waveguide 320 into the third waveguide 325. Similarly, the central region of the two by three coupler 301 may be configured such that light received at the input region of the third waveguide 325 is at least partially coupled into the second waveguide 320, and at least a portion of that light is coupled from the second waveguide 320 into the first waveguide 315. As a result, when a first input light and a second input light are simultaneously introduced respectively into the input regions of the first and third waveguides 315, 325, the first, second, and third waveguides 315, 320, 325 will each output a combination of the first input light and the second input light.

In some variations, the central region is configured such that portions of the first, second, and third waveguides 315, 320, 325 may change widths and may increase or decrease in size within the central region. For example, as shown in FIG. 3A, the second waveguide 320 narrows in the central region from the second region and the fourth region, while the first and third waveguides 315, 325 each widen in the central region from the second region to the fourth region. In some instances, the first, second, and third waveguides 315, 320, 325 taper adiabatically to provide for adiabatic optical coupling between the first waveguide 315 and the second waveguide 320 and between the second waveguide 320 and the third waveguide 325. In some embodiments, the portions of the first and second waveguides 315, 320 in the central region may still be adiabatically coupled and may not be tapered.

As illustrated in the output region in FIG. 3A, the first and third waveguides 315, 325 may taper through the output region. That is, the first waveguide 315 may be wider around S4 than at S5 and the third waveguide 325 may taper similarly. Additionally, the second waveguide 320 has a cross-section that expands and gets wider from S4 to S5 in the output region. As illustrated, the second waveguide 320 may expand at a different location in the output region than where the first and third waveguides 315, 325 begin to expand. In still further embodiments, the location of the narrowing of the first and third waveguides 315, 325 and the location of the second waveguide 320 may be in a different position in the output region.

The first waveguide 315 and the third waveguide 325 may be adiabatically, optically coupled to the second waveguide 320 in the central region as well as the first and second S-bend regions. In FIG. 3A, the second waveguide 320 may receive approximately equal amounts of light from both the first waveguide 315 and the third waveguide 325, as a first gap 322 (e.g., the distance between the first waveguide 315 and the second waveguide 320) is approximately or exactly the same as a second gap 323 (e.g., a distance between the second waveguide 320 and the third waveguide 325). As long as the first and second gaps 322, 323 are approximately equal, the optical coupling from the first and third waveguides 315, 325 to the second waveguide 320 is approximately equal. For example, the first gap 322 may increase in width in the central region; as long as a width of the second gap 323 similarly changes, the optical coupling from the first and third waveguides 315, 325 to the second waveguide 320 remains approximately the same.

As shown in FIG. 3A, the first waveguide 315 and the third waveguide 325 become wider along the central region, while the second waveguide 320 decreases in width. In other embodiments, the central region may be omitted and thus, the waveguides may not change width when transitioning from the first S-bend region to the second S-bend region. In such embodiments, waveguides may optically couple in the first and second S-bend regions.

In the fourth region (the second S-bend region between S3 and S4), is a region in which the distances between the first, second, and third waveguides 315, 320, 325 increase from the third region to the fifth region to terminate the coupling between these waveguides. Accordingly, one or more of the first, second, and third waveguides 315, 320, 325 include one or more bends or curves (such as an S-bend or a C-bend). For example, in the variation shown in FIG. 3A, the portions of the first waveguide 315 and the third waveguide 325 in the fourth region are S-shaped and are approximately symmetric as in the first S-bend region, and the corresponding portion of the second waveguide 320 has a constant cross-section. As described in further detail herein, the S-shaped portions of the first waveguide 315 and the third waveguide 325 may enhance optical coupling in the first S-bend region and reduce optical coupling in the second S-bend region between the first waveguide 315 and the second waveguide 320, and between the second waveguide 320 and the third waveguide 325.

In addition to the adiabatic optical coupling between the waveguides in the central region, optical coupling may also occur in the first and second S-bend regions. In these regions, the first waveguide 315 and the third waveguide 325 have S-bend-shaped cross-sections and are symmetric to each other about the second waveguide. The S-bend cross-section enables optical coupling between the first waveguide 315 and the second waveguide 320, as the gap width decreases between these two waveguides from the start to the end of the first S-bend region, as does the gap width between the third waveguide and the second waveguide. That is, as the gap between the waveguides decreases, the optical coupling between the waveguides may increase. In other embodiments, optical coupling may not occur in these S-bend regions.

In other embodiments, the portions of the first waveguide 315 and the third waveguide 325 may be asymmetrically shaped. Additionally, the second waveguide 320 may be curved (e.g., not straight) in other embodiments. The widths of the first waveguide 315, the second waveguide 320, and the third waveguide 325 are illustrated as being approximately the same, but in some embodiments may be different.

In the output region (e.g., illustrated between S4 and S5), the first, second, and third waveguides are sufficiently separated such that there is no coupling between these waveguides. Accordingly, when light is introduced into the input regions of the first and/or third waveguides 315, 325, the first, second, and third waveguides will respectively output a first, second, and third output signal 330, 335, 340. If a first input light and a second input light having the same wavelength but a different phase are simultaneously introduced respectively into the input regions of the first and third waveguides 315, 325, the first waveguide 315 outputs a first output signal 330 that has a first wavelength response with a first phase shift, the second waveguide 320 outputs a second output signal 335 that has a second wavelength response with a second phase shift, and the third waveguide 325 outputs a third output signal 340 with a third wavelength response and a third phase shift. Accordingly, the wavelength response of the first, second, and third output signals 330, 335, 340 results in each output signal varying sinusoidally as a function of the wavelength of the first and second input light, but with a different phase as compared to the other output signals (i.e., may have three different phases). The output signals and the corresponding phases will be described in further detail with reference to FIGS. 4A-6D.

Figure 7A:
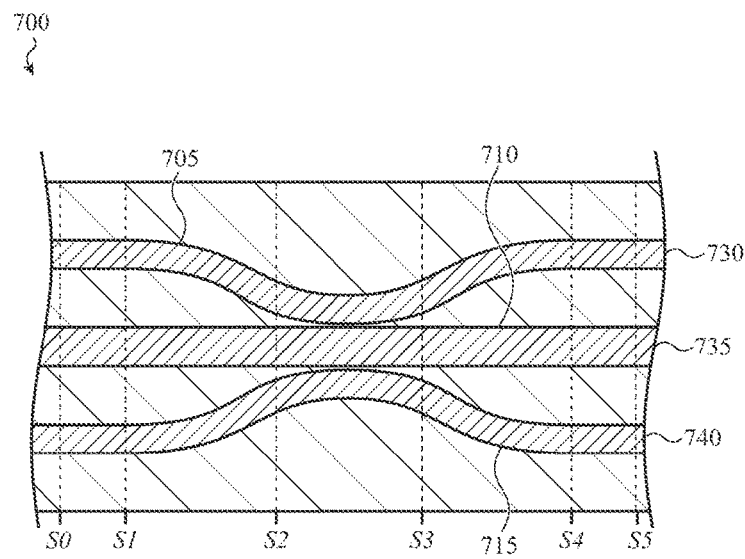
FIG. 7A is a cross-sectional view of another variation of a two by three coupler.

FIG. 7A shows another variation of a two by three coupler 700 as described herein. The two by three coupler 700 includes a first waveguide 705, a second waveguide 710, and a third waveguide 715, where the second waveguide 710 is positioned between the first waveguide 705 and the third waveguide 715. As with the two by three coupler 301 of FIG. 3A, the two by three coupler 700 includes a first region (extending up to line S1), a second region (positioned between lines S1 and S2), a third region (positioned between lines S2 and S3), a fourth region (positioned between lines S3 and S4), and a fifth region (extending from line S4).

The first region acts as a third region where the first, second, and third waveguides 705, 710, 715 are not optically coupled to each other (and thus light is not transferred between these waveguides in the first region). While the embodiment of two by three coupler 700 shown in FIG. 7A depicts the second waveguide 710 as extending into the input region, in other variations the second waveguide 710 alternatively starts in the second region (and thus is not present in the first region). The second region acts as a first bend region where the distance between the first, second, and third waveguides decreases, so that light may couple between the waveguides in the third region. It should be appreciated that some coupling may occur between the first waveguide 705 and the second waveguide 710 and/or between the second waveguide 710 and the third waveguide 715 within the first bend region. To bring the waveguides closer to each other, some or all of the first, second, and third waveguides 705, 710, 715 include one or more curved sections. For example, in the variation shown in FIG. 7A, the first and third waveguides 705, 715 each curve toward the second waveguide 710 and the second waveguide 710 is straight in the first bend region.

The third region acts a coupling region, where light couples between the first, second, and third waveguides 705, 710, 715. Specifically a portion of light travelling through the first waveguide 705 in the coupling region may couple into the second waveguide 710, and vice versa. Similarly, a portion of light travelling through the third waveguide 715 in the central region may couple into the second waveguide 710, and vice versa. In this way, the central region of the two by three coupler 700 may be configured such that the first waveguide 705 in the input region is at least partially coupled into the second waveguide 710, and at least a portion of that light is further coupled from the second waveguide 710 into the third waveguide 715. Similarly, the central region of the two by three coupler 700 may be configured such that light received by the third waveguide 715 in the input region is at least partially coupled into the second waveguide 710, and at least a portion of that light is further coupled from the second waveguide 710 into the first waveguide 705. As a result, when a first input light and a second input light are simultaneously introduced respectively into the first and third waveguides 705, 715 in the input region, the first, second, and third waveguides 705, 710, 715 will each output a combination of the first input light and the second input light.

The fourth region acts as a second bend region where the distance between the first, second, and third waveguides increases, so that the first, second, and third waveguides 705, 710, and 715 are no longer optically coupled in the fifth region. For example, in the variation shown in FIG. 7A, the first and third waveguides 705, 715 each curve away the second waveguide 710 and the second waveguide 710 is straight in the second bend region. It should be appreciated that some coupling may occur between the first waveguide 705 and the second waveguide 710 and/or between the second waveguide 710 and the third waveguide 715 within the second bend region. The fifth region acts as an output region in which each waveguide of the first, second, and third waveguides 705, 710, 715 is optically decoupled from the remaining waveguides. The fifth region may be used to provide outputs (e.g., one from each waveguide) to other portions of an optical system incorporating the two by three coupler 700.

In the variation of the two by three coupler 700 shown in FIG. 7A, the widths of each of the first, second, and third waveguides 705, 710, 715 may be constant in the coupling region. In some of these variations, the second waveguide 710 has a width greater than the widths of the first and third waveguides 705, 715. In some of these variations, the width of the first waveguide 705 may be the same as the width of the third waveguide 715. When the two by three coupler 700 is configured as shown in FIG. 7A to have constant widths for each of the waveguides in the third region, with the second waveguide 710 being wider than the first and third waveguides 705, 715 in this region, the relative widths of the waveguides (and spacing therebetween) may be selected to achieve a target phase difference between the wavelength responses of the outputs. In some of these variations, the first, second, and third waveguides 705, 710, 715 may have constant widths across some or all of the other regions (e.g., the first, second, fourth, and/or fifth regions). For example, in some variations the first, second, and third waveguides have constant widths across the entire two by three coupler 700.

Specifically, the two by three coupler 700 is configured such that when the first and third waveguides 705, 715 respectively receive a first input light and a second input light having the same wavelength but different phases, the first, second, and third waveguides will each output light with a corresponding intensity that has a sinusoidal wavelength relationship, such as described above. In some instances, the waveguides may be dimensions and positioned to achieve a 120 degree phase difference between the wavelength relationship for each output. In these instances, there is a 120 phase difference between the wavelength relationships of the output signals from the first and second waveguides 705, 710, between the wavelength relationships of the output signals from the first and third waveguides 705, 715, and between the wavelength relationships of the output signals from the second and third waveguides 710, 715. With a 120 phase difference between each of the wavelength relationships, at least one output of the two by three coupler 700 will be in the middle of its working zone for every wavelength in its range of input wavelengths.

The two by three couplers described above may be capable of operating across a range of input wavelengths, such that the first, second, and third output signals will each have their corresponding wavelength response across this range. As a result, the two by three couplers may receive phase-shifted input light at any wavelength within the range, and shifts to the wavelength of the input light will cause a sinusoidal change to each output signal. Accordingly, when the two by three coupler is used with a wavelength locking system as discussed herein, these output signals may be used to lock the wavelength of a light source to any target wavelength within the wavelength range. As mentioned above, the wavelengths of the received light by the two by three coupler during operation of an optical system may span a wavelength range of at least 50 nm, at least 100 nm, at least 400 nm, at least 1000 nm, at least 1500 nm or the like.

Wavelength Locking Device

Figure 3B:
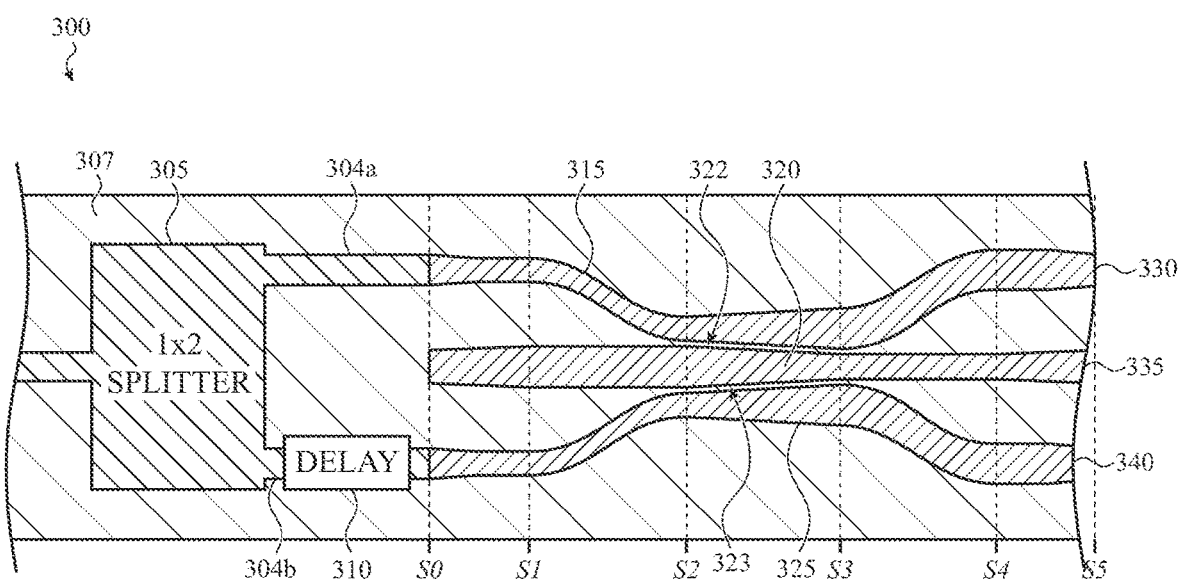
FIG. 3B is a cross-sectional view of an example wavelength locking system with the two by three coupler shown in FIG. 3A.

The two by three couplers above may be incorporated into a wavelength locking system to lock the wavelength of a light source to a target wavelength as discussed above. For example, FIG. 3B illustrates an example wavelength locking system 300 utilizing the two by three coupler 301 of FIG. 3A. The wavelength locking system 300 includes a splitter 305, cladding 307, a phase shifter 310, and a two by three coupler 301 (which includes a first waveguide 315, a second waveguide 320, and a third waveguide 325 as discussed above). The cladding 307 may surround the components of the wavelength locking system 300 to reduce light loss and to confine light to the propagation regions, thus defining the waveguides. The components of the wavelength locking system 300 have similar functionality and may be similarly configured as the corresponding components of the wavelength locking system 200. The wavelength locking system 300 is a structure that generates three output signals having wavelength responses with different phases, which may be optionally unwrapped as discussed below for the purpose of wavelength locking and that cover a broadband wavelength range. Phase unwrapping is used to create a monotonic relationship between an extracted phase value and wavelength that may assist with wavelength tracking as the wavelength shifts.

In the embodiment 300 of FIG. 3B, the splitter 305 may receive input light and split the light across two outputs. The splitter 305 may be a one by two splitter that splits light approximately (or exactly) equally between the two outputs. In other examples, the splitter 305 may split the power asymmetrically, with the two by three coupler 301 still outputting signals with different sinusoidal wavelength relationships. Any splitter or combination of splitters may be used, so long as the two outputs provide light to corresponding inputs of the two by three coupler 301, and a one by two splitter is used for explanatory purposes only. The first output 304a of the splitter 305 may be passed to the first input of the two by three coupler 301, namely to the first waveguide 315 in the input region of the two by three coupler 301. The second output 304b may be passed to the second input of the two by three coupler 301 via the phase shifter 310, which introduces a phase shift to the light of the second output relative to the light of the first output. The phase shifter 310 may function as a delay line, similar to the delay introduced by the different length arms of an MZI In other words, the second output 304b may have a sufficiently different length than the first output 304a to introduce the phase delay. Alternatively, the phase shifter 310 may be an active component (e.g., such as an electrooptic phase shifter, a thermo-optic phase shifter, or an optomechanical phase shifter) that is actively controlled to generate the phase shift. Light passes through the phase shifter 310 to the third waveguide 325 in the input region of the two by three coupler 301.

As previously described, the wavelength locking system 300 may be used to lock input light received by the wavelength locking system 300 to a target wavelength. To that end, the input light to the splitter 305 may receive any wavelength of light from a range of wavelengths spanning a broadband wavelength range. Indeed, at different times the wavelength locking system 300 may lock the input light to different wavelengths across a wide range of target wavelengths. In some examples, a first wavelength of light may be received as input light at a first time (and locked to a first target wavelength) and a second wavelength of light may be received as input light at a second time (and locked to a second target wavelength).

As mentioned above, when input light of a given wavelength is received by the splitter 305, the two by three coupler 301 receives first and second input light at the first waveguide 315 and the third waveguide 325, where the first and second input light have the same wavelength but different phases. The first and second input light will couple between the first, second, and third waveguides 315, 320, 325 to produce three output signals. The portion of the first light in each waveguide will interfere with the portion of the second light in that waveguide, which results in the output signal having a constant intensity. As mentioned above, this intensity is wavelength dependent, such that each output signal will have a sinusoidal wavelength relationship as discussed previously, but with different relative phases. That is, the three wavelength relationships may have a relative delay from one another (e.g., may have a constant phase difference from one another). This may result in the dead zones from the wavelength relationships being offset from each other, so that at any given wavelength there is at least one output signal that is in its working zone (and thus overall the overall wavelength locking system 300 effectively does not have a dead zone). This may result in the ability to accurately lock to any target wavelength within a broad wavelength range. Additionally, the output signals may be phase unwrapped so that every wavelength may be locked. Phase unwrapping will be described in further detail with reference to FIGS. 4A-6D.

Figure 4A:
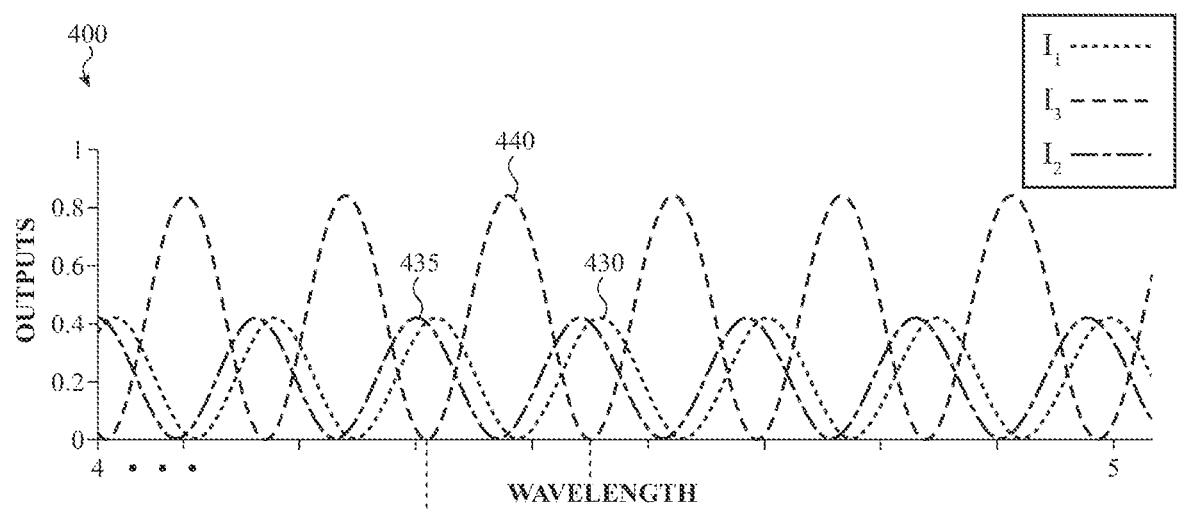
FIG. 4A is a graph showing example output signals from a wavelength locking system such as the one illustrated in FIG. 2.
Figure 4B:
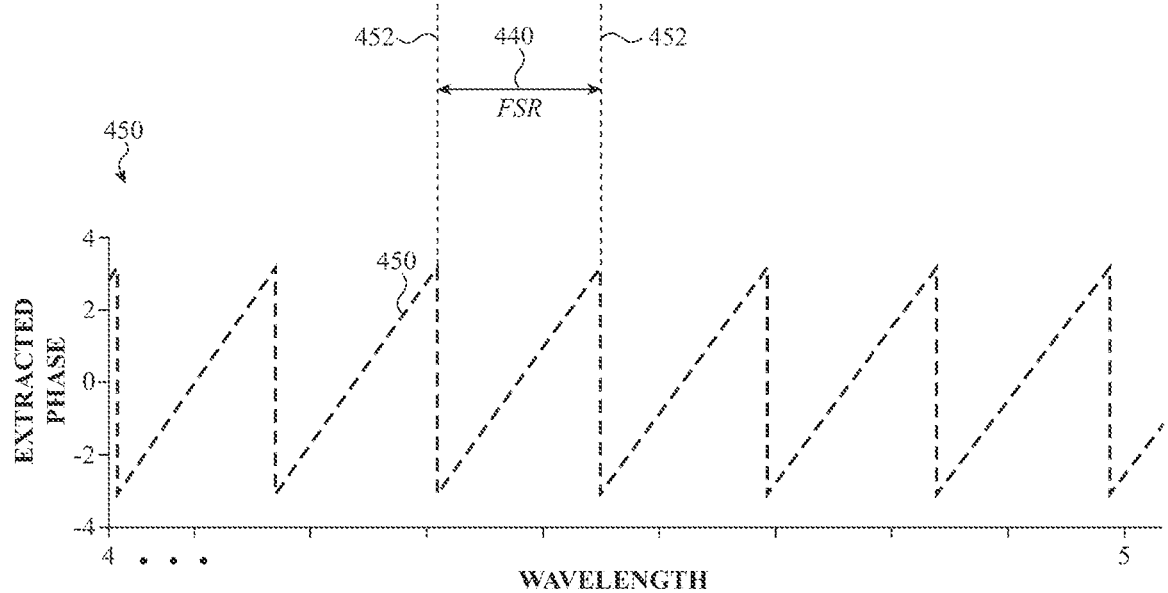
FIG. 4B is a graph showing example extracted phases from the example output signals of FIG. 4A.

FIG. 4A is a graph showing sample wavelength relationships of the output signals from a wavelength locking system, while FIG. 4B is a graph showing an example of extracted phases from the output signals of FIG. 4A. The output signal graph 400 includes the intensity of each of a first output signal 430, a second output signal 435, and a third output signal 440 as a function wavelength. These output signals may correspond to the first, second, and third output signals of FIG. 3. The output signals of FIG. 4A may be generated in the same fashion discussed with respect to the output of FIG. 3 that are outputted by the first, second, and third outputs 330, 335, and 340 of the first, second, and third waveguides 315, 320, and 325.

In the graph of FIG. 4A, the horizontal axis represents wavelength ranges of light across while the vertical axis represents signal amplitude. The horizontal axis of the graph has arbitrarily assigned numbers 4 and 5, and the horizontal axis represents a wavelength range. FIGS. 4A, 4B, 6A, 6B, 6C, and 6D are consistently numbered relative to one another, such that point 4 on each of the X-axes of these graphs is the same wavelength within the wavelength range. As shown in FIG. 4A, the phase differences of wavelength responses of the output signals 430, 435, and 440 are consistent, as are the relative offsets between the output signals. The wavelength responses of the output signals 430, 435, and 440 are generally sinusoidal signals.

The output signals may be used to measure any discrepancy between a wavelength of light (i.e., generated by a light source and received by a wavelength locking system) and a target wavelength. Specifically, the target wavelength will have an expected intensity for each of the output signals 430, 435, and 440. The differences between the measured intensities and these expected intensities are indicative of the discrepancy between the measured wavelength and the target wavelength. Accordingly, the measured intensities may be used to determine the wavelength of the measured light. Additionally or alternatively, these measured intensities may be used to generate a feedback signal that is used to control the operation of the light source to alter the wavelength of the generated light, and thereby lock it to the target wavelength.

As mentioned above, when an output signal is in a dead zone, changes in wavelength will result in relatively small changes in the intensity of the output signal. As a result, the effectiveness of a single output signal in determining wavelength changes is limited in that output signal's dead zones. In the wavelength locking systems described herein, however, the multiple output signals may have a constant phase difference between their wavelength responses. This may result in dead zones for each output signal that do not align with the dead zones of the other output signals. As a result, useful information may be available from at least one output signal for all wavelengths across the wavelength range.

Specifically, each of the output signals 430, 435, and 440 have varying slopes and inflection points. The most information for a given output signal is available for a wavelength when the slope is the steepest or at a maximum (i.e., within the working zones), which will result in the largest change in signal intensity as a function of wavelength change. At every wavelength, at least one of the output signals 430, 435, and 440 has a non-zero slope (e.g., there is no simultaneous overlap between a maximum or minimum for all of the output signals), thus each of the output signals 430, 435, and 440 may have information available for wavelength locking at that particular wavelength. As mentioned above, this may facilitate wavelength locking across a wide wavelength range (e.g., with a bandwidth such as 1000 nm).

Figure 7B:
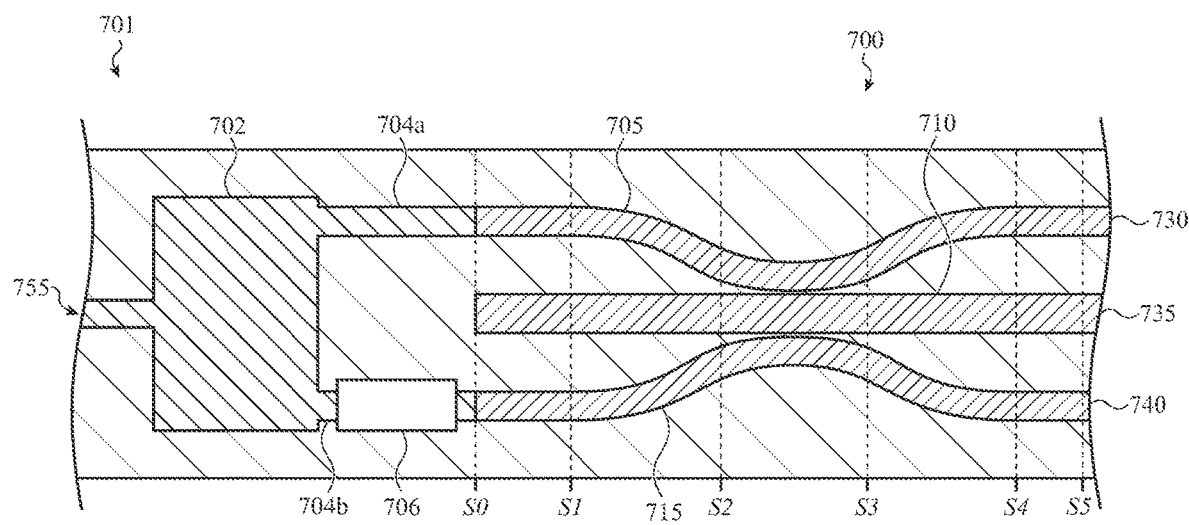
FIG. 7B is a schematic diagram of a wavelength locking system that incorporates the two by three coupler of FIG. 7A.

FIG. 7B shows another variation of a wavelength locking system 701, which includes the two by three coupler 700 described in FIG. 7A. As shown there, the wavelength locking system 701 includes a splitter 702 that receives input light (e.g., from a light source such as discussed previously) at an input 755 and splits the input light between a first output 704a and a second output 704b. The second output 704b includes a phase shifter 706 that may introduce a phase shift in the second output 704b relative to the first output 704a as discussed above. Accordingly, when light of a given wavelength is received at the input 755 of the splitter 702, the first and second outputs 704a, 704b of the splitter 702 will output light of that wavelength with two different phases.

The first and second outputs 704a, 704b optically couple the splitter 702 to the two by three coupler 700 at line S0. Specifically, the first and second outputs 704a, 704b are optically coupled respectively to the first and third waveguides 705, 715 of the two by three coupler 700 in the input region of the two by three coupler 700. In this way, when light of a given wavelength is introduced into the input 755 of the splitter 702, the first waveguide 705 receives a first input light having that wavelength and a first phase and the third waveguide 715 receives a second input light having that wavelength and a second phase. When it receives these inputs, the first, second, and third waveguides 705, 710, 715 will respectively output a first output signal 730, a second output signal 735, and a third output signal 740. These output signals will each have a constant intensity (i.e., as a result of the interference between the phase-shifted first input light and the second input light) that varies sinusoidally as a function of wavelength of the input light.

These output signals may be used to determine a wavelength of the input light and/or used as feedback to control operation of the light source (e.g., to lock the input light to a target wavelength) as discussed previously. The wavelength response of these output signals may be phase-shifted relative to each other, such that over a range of wavelengths there is always at least one output signal that is not in a dead zone. These wavelength responses may be similar to those illustrated in FIG. 4A, but with different relative phases between the wavelength response of each output signal. For example, the two by three coupler 700 may be configured such that there is a 120 degree phase shift between the wavelength response for each of the first, second, and third output signals 730, 735, 740.

Phase Unwrapping

As mentioned above, the systems described here may optionally use phase unwrapping techniques in performing wavelength locking. As shown in FIG. 4B, the extracted phase graph 450 illustrates unwrapped phases of free spectral ranges ("FSRs") over part of the wavelength range of input light, represented by arbitrarily assigned numbers 4 to 5. The free spectral range is the spacing between two successive reflected or transmitted optical intensity maximums or minimums, in a single output signal 430, 435, 440 (i.e., the free spectral range of output signal 440 is shown in FIG. 4B). Put another way, the free spectral range is the range of wavelengths between successive peaks or successive troughs of an output signal. By phase unwrapping the signal to reconstruct the original phase of the signal, the discrepancy between the measured wavelengths (or ranges of wavelengths) and target wavelength or target range of wavelengths of an ideal output signal(s) is obtained.

Phase unwrapping may be achieved by using a complex variable S to represent the operation of the two by three coupler. General equations for the complex variable S may not be appropriate as they typically apply to narrowband devices and do not extract unwrapped phases for broadband devices. The derived complex variable S for broadband devices may have an angle proportional to the phase shift between the first waveguide and the third waveguide of FIG. 3. The complex variable S may be represented by the equation:

$S = x + jy,$ where $x = x_{bar}/k_x$ and $y = y_{bar}/k_y,$ and $x_{bar} = I_3/|c_2|^2 - ((I_1+I_2)/(|a_2|^2+|b_2|^2))$ and $y_{bar} = I_1 - I_2$ and $k_x = 1 - ((2|a_2||b_2|)/(|a_2|^2+|b_2|^2)) * \cos(\Delta\Theta)$ and $k_y = -2*|a_2||b_2|*\sin(\Delta\Theta)$ where $|a_2|$, $|b_2|$, and $|c_2|$ are the amplitudes of the scattering parameters for the two by three coupler between the first input and the first, second, and third output signals 430, 435, and 440. $I_1$, $I_2$, and $I_3$ are the output signals 430, 435, and 440 of the corresponding FSR. Additionally, $\Delta\Theta$ is the phase difference between output signals 430 and 440. Using these equations to obtain data across a given wavelength range (e.g., a bandwidth of 1000 nm or other bandwidths as discussed above), the unwrapped phase may be extracted over the wavelength range received by the two by three coupler included in the wavelength locking system 300 of FIG. 3 to produce an unwrapped phase signal.

Although the phase has been extracted from the FSR of the output signal 430 as shown in FIGS. 4A and 4B, the unwrapped phase signal still includes the zero points of the output signals. Similar to the output signal graph 400, at the spikes or zero points 452 (e.g., the vertical lines in the extracted phase graph 450, also referred to as a "jump") of the extracted phase graph 450, little to no information is available for wavelength locking at the particular wavelength at which the zero point 452 occurs. Additionally and as previously described with reference to FIG. 3, the phase may be shifted or delayed by the phase shifter. As the delay is increased, the phase difference (e.g., free spectral range) may get smaller. Further, as the delay is increased, the wavelength locking efficiency increases.

Figure 5:
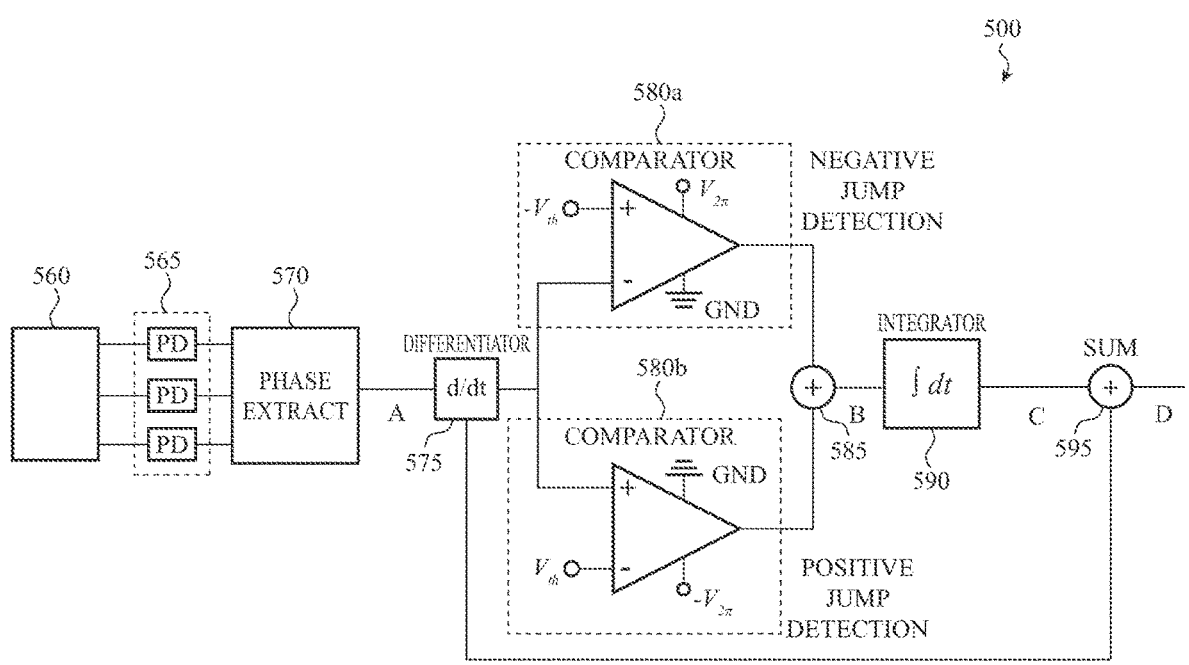
FIG. 5 is a sample circuit diagram of an example circuit for phase unwrapping output signals.

FIG. 5 is an example circuit diagram for phase unwrapping output signals, while FIGS. 6A-6D illustrate graphs corresponding to output signals at points along the circuit diagram. The phase unwrapping circuit 500 may implement an algorithm for unwrapping phases of output signals. The phase unwrapping circuit 500 includes a two by three coupler 560, photodetectors 565, a phase extract block 570, a differentiator 575, a negative jump comparator 580a, a positive jump comparator 580b, a first summer 585, an integrator 590, and a second summer 595. Points A, B, C, and D are shown on the phase unwrapping circuit 500; signals measured at each of these points are shown on the graphs in FIGS. 6A, 6B, 6C, and 6D, respectively.

Figure 6A:
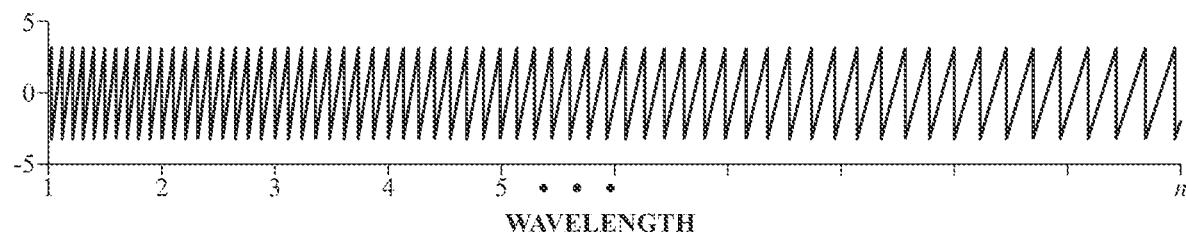
FIGS. 6A-6D are graphs of signals measured at various nodes of the circuit diagram of FIG. 5.
Figure 6B:
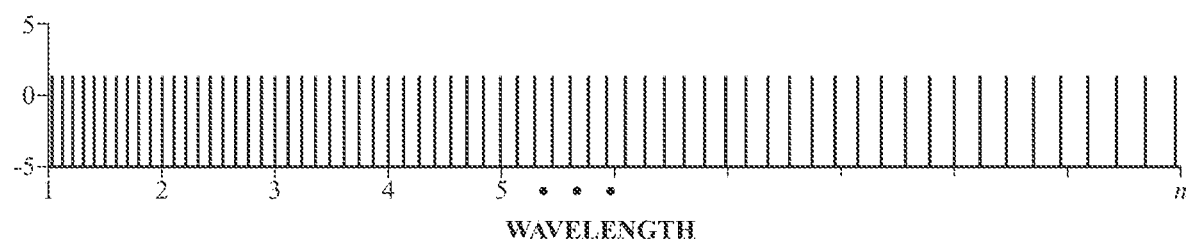
Figure 6C:
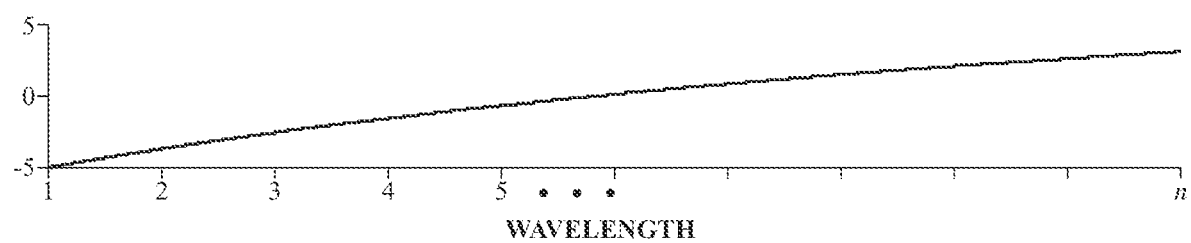
Figure 6D:
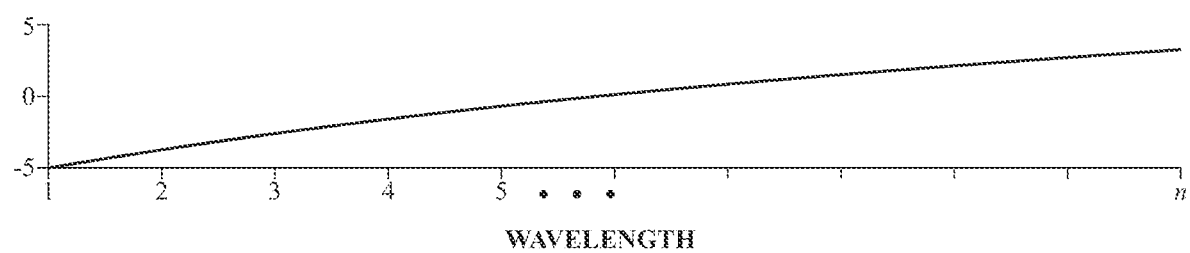

Point A is the point at which the signal shown on the graph of FIG. 6A is measured and is located between the phase extract block 570 and the differentiator 575. Point B is the point at which the signal shown on the graph of FIG. 6B is measured and is located between the first summer 585 and the integrator 590. Point C is the point at which the signal shown on the graph of FIG. 6C is measured and is located between the integrator 590 and the second summer 595, and point D is the point at which the signal shown on the graph of FIG. 6D is measured and is located after the second summer 595. The signal measured at point D is the output signal of the phase unwrapping circuit 500.

The two by three coupler 560 outputs three output signals to the photodetectors 565. The three output signals may be the light output signals described with reference to FIGS. 3 and 4A-4B. The photodetectors 565 receive the light output signals and convert them to the output signals as depicted in the output signal graph 400 of FIG. 4A. The photodetectors 565 may be part of an array or may be single units. Further, the photodetectors 565 may be any appropriate optical detector. The output signals from the photodetectors 565 may be transmitted to the phase extract block 570.

The phase extract block 570 performs the operations described with respect FIG. 4B, namely unwrapping a phase of an output signal. Accordingly, the phase extract block may take a signal as shown in the graph of FIG. 4A and use it as an input to generate the signal of the graph shown in FIG. 4B. More specifically, the phase extract block 570 may extract the unwrapped phase from the output signal (e.g., generate a signal corresponding to this unwrapped phrase) by implementing the equations described with reference to FIG. 4B. Further, the output of the phase extract block 570 may be measured at point A; this measurement is shown in the graph of FIG. 6A. It should be appreciated that the graph of FIG. 4B is a segment of the graph of FIG. 6A, and is specifically an expanded view between points 4 and 5 on the horizontal axis of FIG. 6A.

As previously discussed with reference to FIG. 4B, the graph of FIG. 6A (illustrating the extracted phase) may still include, or have points corresponding to, the zero points of the output signals. At the spikes or zero points (e.g., the vertical lines in the extracted phase graph 450) of the extracted phase graph in FIG. 6A, little to no information is available for wavelength locking for the particular wavelength, and thus a continuous curve may be desirable for wavelength locking as it produces a one to one relationship between the wavelength and the output signal.

The spikes in the graph of FIG. 6A are indicative of the signal increasing or "jumping" two $\pi$. Typically, a phase jump occurs when the phase value entry exceeds the value of $\pi$ or $-\pi$, such that the point jumps to the opposite value even though the phase may be continuously increasing or decreasing. One way to detect and mitigate the sharp transitions or spikes in the graph of FIG. 6A is to differentiate the signal. The output of the differentiation block is a negative spike when the wavelength is swept in a positive direction (e.g., the phase jump occurs from $\pi$ to $-\pi$). On the other hand, when the wavelength is swept in a negative direction (e.g., the phase jump occurs from $-\pi$ to $\pi$), the output has a positive spike. Depending on whether the spike is detected from a positive direction or a negative direction, two $\pi$ may be subtracted or added, respectively until the phase is within $-\pi$ to $\pi$.

Returning to FIG. 5, the phase extract block 570 may provide the extracted phase signal to the differentiator 575, which differentiates the signal received from the phase extract block 570. The differentiator 575 may be used to detect the spikes (e.g., two $\pi$ jumps) in the signal and transmit this information in a differentiated signal to the negative jump comparator 580a and positive jump comparator 580b. The differentiated signal is the output of the differentiator 575 and is a negative spike when the wavelength is swept in a positive direction (e.g., a phase jump occurs from $\pi$ to $-\pi$). Further, when the wavelength is swept in a negative direction, (e.g., a phase jump occurs from $-\pi$ to $\pi$), the output has a positive spike.

The negative jump comparator 580a and the positive jump comparator 580b are used to add or subtract two $\pi$ to the signal at the wavelength where the spike occurs. The signals from the negative jump comparator 580a and the positive jump comparator 580b may be summed together by the first summer 585. The signal output of the first summer 585 is measured at point B, and shown in the graph of FIG. 6B. The negative jump comparator 580a and the positive jump comparator 580b compare the differentiated signal with a specific threshold voltage. The negative jump comparator 580a and the positive jump comparator 580b may draw a distinction between two cases: a first case where the wavelength is increasing; and a second case where the wavelength is decreasing. The first case may result in a negative jump in the signal of FIG. 4B and thus two $\pi$ may be added to the signal by the negative jump comparator 580a. Conversely, the second case may result in a positive jump and two $\pi$ may be subtracted by the positive jump comparator 580b. The negative and positive jumps are determined by comparing the differentiated signal to negative and positive and voltage thresholds of the negative jump comparator 580a and the positive jump comparator 580b.

The output of the first summer 585 may be passed to the integrator 590, which integrates the signal over two $\pi$ to produce a staircase signal which is point C that corresponds to the graph illustrated in FIG. 6C. The staircase signal generated from the integrator 590 is the correction value that produces the fully linear and continuous signal. Because the continuous signal produces a one to one relationship between the wavelength and the signal and is desirable, the staircase signal of point C in FIG. 5 and of the graph in FIG. 6C may be summed at the second summer 595 with the signal from the differentiator 575 to produce the fully linear signal. This linear and continuous signal is the graph illustrated in FIG. 6D and provides a one to one relationship between the wavelength and the signal. Point D or the output of the summer 595 provides the amount of phase shift per wavelength needed to wavelength lock the corresponding wavelength.

In practice, the optical device may include a number, N, of lasers operating at different wavelengths in the wavelength range between 1.4 and 2.4 um. The optical device may include drive electronics that enable time multiplexing between the lasers such that each one may emit light at a specific time. The drive electronics also may include a feedback loop that controls the laser frequency with a controller. The input to this controller may be the output from the phase unwrapping signal (response signal) where the controller compares this signal with a desired target value (e.g., a predetermined value that is determined during a calibration step as described below). Due to environmental variations (e.g., temperature or other noise sources), the laser frequency changes may affect the error signal (e.g., the difference between the set value and the response signal). That error signal may be used to change the laser drive current (e.g., control signal) value to set the laser wavelength to the desired operating value.

In some embodiments, a calibration step may be performed before operating in the closed loop form to determine the set point equivalent to the targeted wavelength. The calibration step may be performed in an open loop configuration where the response signal may be measured together with the laser wavelength while the drive current is being swept. Because one laser emits light at a time, more than one laser may not be locked at the same time. However, in some embodiments, using one circuit for wavelength locking may be more efficient, thus allowing the scaling down of at least one, more than one, or all of weight, size, and power. Accordingly, the calibration step may be performed for each laser individually Although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An optical device, comprising:
a light source configured to generate light;
a splitter for receiving and splitting the light received from the light source into a first light along a first light path and a second light along a second path;
a phase shifter positioned to receive the first split light along the first light path and to phase shift the first split light relative to the second split light;
a two by three coupler comprising:
  a first waveguide configured to:
    receive the first split light along the first light path; and
    output a first output signal with a first wavelength response and a first phase shift;
  a second waveguide optically coupled to the first waveguide and configured to output a second output signal with a second wavelength response and a second phase shift; and
  a third waveguide optically coupled to the second waveguide and configured to:
    receive the second split light along the second light path; and
    output a third output signal with a third wavelength response and a third phase shift; and
a set of photodetectors positioned to receive the first output signal, the second output signal, and the third output signal, wherein:
  the first phase shift and the second phase shift are offset by a first phase difference;
  the second phase shift and the third phase shift are offset by a second phase difference;
  the first phase shift and the third phase shift are offset by a third phase difference;
  the first phase difference, the second phase difference, and the third phase difference are constant
  the first waveguide, the second waveguide, and the third waveguide have constant widths in a coupling region; and
  the second waveguide is wider than the first waveguide and the third waveguide in the coupling region.

2. The optical device of claim 1, further comprising a phase shifter operable to phase shift the second light; wherein:
the phase shift of the second light controls wavelength locking efficiency of the first, the second, and the third output signals; and
the first phase shift, the second phase shift, and the third phase shift are constant over a wavelength range of approximately one micron.

3. The optical device of claim 1, wherein the first waveguide and third waveguide are symmetric about the second waveguide.

4. An optical system for monitoring a wavelength of a light source, comprising:
the light source configured to generate light;
a splitter for receiving and splitting the light received from the light source into a first split light along a first light path and a second split light along a second path;
a phase shifter positioned to receive the first split light along the first light path and to phase shift the first split light relative to the second split light;
a two by three coupler comprising a first waveguide, a second waveguide, and a third waveguide, and configured to:
  receive the first split light from the phase shifter at the first waveguide along the first light path;
  receive the second split light from the splitter at the third waveguide along the second light path; and
  output a first output signal from the first waveguide, a second output signal from the second waveguide, and a third output signal from the third waveguide, each of which has a respective intensity based on a respective interference between the first split light and the second split light;
a set of photodetectors positioned to receive the first output signal, the second output signal, and the third output signal; and
a controller configured to monitor a wavelength of the light received by the splitter using intensities of the first output signal, the second output signal, and the third output signal, wherein:
the first waveguide, the second waveguide, and the third waveguide have constant widths in a coupling region; and
the second waveguide is wider than the first waveguide and the third waveguide in the coupling region.

5. The optical system of claim 4, wherein:
the controller comprises a set of photodetectors;
the set of photodetectors converts the first output signal, the second output signal, and the third output signal to a first digital output signal, a second digital output signal, and a third digital output signal;
the controller compares the first digital output signal, the second digital output signal, and the third digital output signal to a first target digital value, a second target digital values, and a third target digital value; and
the controller transmits a feedback signal to the light source to control the first output signal, the second output signal, and the third output signal at the first target digital value, the second target digital value, and the third target digital value.

6. The optical system of claim 4, further comprising:
a phase extract block that receives the first output signal, the second output signal, and the third output signal and extracts an unwrapped phase signal;
a differentiator that receives the unwrapped phase signal and is configured to:
  detect zero points in the unwrapped phase signal; and
  generate a differentiated signal indicative of the detected zero points;
a set of comparators configured to adjust the zero points; and
an integrator configured to generate integrated signals for use in producing a continuous signal for wavelength locking;
a set of photodetectors operable to:
  receive the first output signal, the second output signal, and the third output signal; and
  transmit a corresponding sinusoidal signal for each of the first output signal, the second output signal, and the third output signal to the phase extract block;
a first summer for summing the first output signal, the second output signal, and the third output signal from the set of comparators; and
a second summer for summing an integrated signal with the differentiated signal, thereby generating a summed signal used to determine an amount of phase shift per wavelength used to lock a measured wavelength of light to a corresponding target wavelength of light.

7. The optical system of claim 6, wherein the integrated signal is a correction value used to generate a one to one relationship between a particular wavelength of the first and second split light and the summed signal.

8. The optical system of claim 6, wherein:
the set of comparators comprises:
  a negative jump comparator; and
  a positive jump comparator;
the negative jump comparator adds two $\pi$ to the differentiated signal;
the positive jump comparator subtracts two $\pi$ to the differentiated signal; and
the optical system further comprises a second summer configured to sum the integrated signals with the differentiated signal, thereby generating a summed signal containing information used to sequentially lock each measured wavelength of light across a wavelength range of approximately one micron.

9. The optical system of claim 4, wherein:
the first output signal has a first sinusoidal wavelength response with a first phase shift;
the second output signal has a second sinusoidal wavelength response with a second phase shift;
the third output signal has a third sinusoidal wavelength response with a third phase shift; and
the first phase shift, the second phase shift, and the third phase shift are constant over a wavelength range of approximately one micron.

10. The optical system of claim 4, wherein the first output signal, the second output signal, and the third output signal are offset from one another by a same phase difference.

11. The optical system of claim 4, wherein a phase shift of the first output signal, the second output signal, and the third output signal is constant over a wavelength range of approximately one micron.

* * * * *